June 1, 1954
C. TORCHEUX
2,679,819
SHOCK-INDICATING DEVICE
Filed Aug. 15, 1950
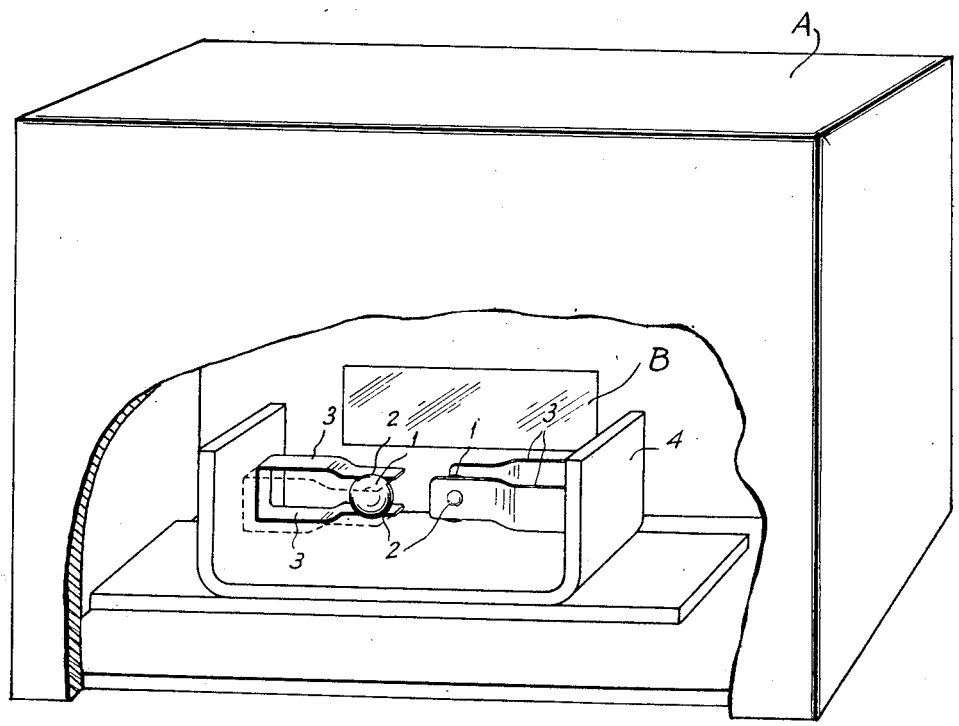
Inventor:
CHARLES TORCHEUX
Attorney.

Patented June 1, 1954

2,679,819

UNITED STATES PATENT OFFICE 2,679,819

SHOCK-INDICATING DEVICE

Charles Torcheux, Paris, France, assignor to Societe d'Electricite Mors, Clichy, France, a corporation of France Application August 15, 1950, Serial No. 179,417

4 Claims. (Cl. 116—114)

Easily breakable apparatus are frequently shipped by various modes of transportation, and especially apparatus similar to measuring instruments, in which shocks and impacts would tend to reduce their useful operating life, or would simply impair their sensitivity and accurate calibration. Obviously, it is always possible to provide a sufficiently elaborate packaging, so that under normal circumstances no excessive impacts would be transmitted to the apparatus shipped, but this would often lead to prohibitive dimensions and excessive packing cost. Carriers generally agree to consider as requiring careful handling those parcels on which an indication such as "With Care" or "With Great Care" is printed in large print, but it is always possible that an excessive shock or impact will be given thereto, whether through carelessness or accident. As the outer packing may not have apparently suffered, it is not known, on receipt of the package, whether the apparatus has sustained damage: lengthy verification, at which the carrier cannot be present, is then necessary.

The present invention relates to means for providing at any time a visible indication of the fact that the apparatus has been subjected to excessive acceleration. This means, which may be installed at a selected location of the packing or of the contents thereof, may be constructed in various ways; one preferred embodiment is that illustrated in the single figure of the accompanying drawing, part of which is shown in section.

The means forming the subject matter of the invention is provided for mounting within a casing A which may be sealed to prevent tampering with the indicator and is characterised by the fact that one (or more) weighty masses 1 is constrained by suitable connections or holders to remain in a definite position, but adapted to be released or freed therefrom if and when said mass (or masses) is subjected to a predetermined acceleration by forces extraneous to the system; said acceleration being of a magnitude such that it can overcome the resistance opposed by said connections. The release of said mass (or masses) 1 therefore supplies indication of the fact that the system (package or the like) has been subjected to abnormal treatment and this indication remains permanent until the mass is manually restored to its holder.

By way of example, the weighty mass 1 may be a ball, which is engaged in spring-plates 3 secured to the frame 4 of the indicator; the whole assembly is preferably arranged in the casing A which is locked and one wall of which may be (wholly or in part) transparent, as at B. As the combination of the ball 1 with the two spring-plates 3 defines a preferential direction (for the release of the ball 1), pairs of differently oriented spring-plates 3 may be disposed in a common indicator (as shown in the accompanying drawing), so that the balls 1 included therein will be released when the urge to which they are subjected is substantially parallel to the last mentioned springstrips 3. If necessary, the tension of said spring-plates may be adjusted in any known way. Essentially two balls with the related mounting means disposed at right angles to each other will suffice to afford full protection in all directions. If the apparatus to be protected has greater sensitivity in one preferential direction, then the adjustment of the tensions retaining the balls may differ.

Windows fitted with a transparent closure may be provided in the package wall, through which the shock indicator contained within said package may be seen, so that a permanent check is possible on the condition of the parcel, and liabilities may be established in case of damage.

The release of the weighty masses might in some cases be made to actuate a sound or visual warning means, break (or complete) an electric circuit pertaining to the apparatus to be protected, etc.

I claim:

1. Shock-indicating device which comprises a casing, at least one resilient U-shaped mounting member, means for securing said mounting member in said casing with its parallel-spaced arms projecting from a wall of the casing, and a weighty member held between said arms adjacent the free ends thereof and resiliently retained therein under a predetermined spring pressure so that said weighty member is released from between said arms when said casing is subjected to excessive acceleration.

2. Shock-indicating device as in claim 1 wherein seating sockets are formed in the adjacent faces of said spring arms towards the free ends thereof, for resiliently seating said body.

3. Device as in claim 2 wherein said weighty body is ball-shaped.

4. Shock-indicating device which comprises a frame, at least two resilient U-shaped mounting members on said frame having their bases secured to parallel surfaces of said frame with the parallel-spaced arms of each mounting member projecting from said base, the two mounting members being angularly displaced 90° relatively to each other, and a weighty member seated between the arms of each mounting member adjacent the free ends thereof and resiliently retained therein under predetermined spring pressure so that excessive acceleration of said frame in any direction will cause release of at least one of the weighty members from the related mounting member.

References Cited in the file of this patent

UNITED STATES PATENTS

| Number | Name | Date |
|---|---|---|
| 1,816,939 | Stangler | Aug. 4, 1931 |
| 1,901,554 | De Wilde | Mar. 14, 1933 |
| 2,544,646 | Barnaby | Mar. 13, 1951 |
| 2,601,440 | Kerrigan | June 24, 1952 |

FOREIGN PATENTS

| Number | Country | Date |
|---|---|---|
| 90,122 | Austria | Nov. 25, 1922 |
| 255,760 | Italy | Nov. 7, 1927 |